United States Patent [19]

Bartlett

[11] 4,052,891
[45] Oct. 11, 1977

[54] WEB TENSION MONITOR

[76] Inventor: Edward C. Bartlett, Skyline Terrace Rte. No. 1 Box 133B, Claremont, N.H. 03743

[21] Appl. No.: 732,535

[22] Filed: Oct. 14, 1976

[51] Int. Cl.² .............................................. G01L 5/10
[52] U.S. Cl. ..................................................... 73/144
[58] Field of Search ........................................... 73/144

[56] References Cited

U.S. PATENT DOCUMENTS

| 3,260,106 | 7/1966 | Hull et al. ............................. 73/144 |
| 3,763,701 | 10/1973 | Wright et al. ........................ 73/144 |

*Primary Examiner*—Charles A. Ruehl

*Attorney, Agent, or Firm*—Kenway & Jenney

[57] ABSTRACT

A web tension monitor in which the tension of a moving web passing over a guide roll is monitored by a sensing device positioned upon a cantilever-mounted support which is coupled to a shaft which carries the roll. Forces applied to the roll by the tensioned web passing over it are coupled to a fixed frame through the cantilever-mounted support by means of a pair of concentric rings between which bearing balls are disposed in confronting openings formed in both members at diametrically opposed points. Misalignment and expansion of machine components can be tolerated to a large degree without causing pre-loading of the sensing device.

6 Claims, 3 Drawing Figures

WEB TENSION MONITOR

BACKGROUND OF THE INVENTION

This invention relates in general to the monitoring of tension in a moving web and in particular to an improved system for coupling forces generated in response to that tension to a sensor.

In various industries, the monitoring of tension in a web which may be moving at a high speed is essential to avoid damage to the web or to maintain proper manufacturing controls. For example, in the manufacture of paper, endless fabric webs are frequently used; and if tension is insufficient, the fabric tends to wrinkle, forming irregularities in the material being carried by the web. Conversely, if tension becomes too great, the web may be destroyed. In many other applications, such as printing presses, and textile manufacturing, it is necessary to continuously observe and maintain tension within suitable limits.

Numerous systems have been devised for such tension monitoring. One such system is exemplified in U.S. Pat. No. 3,260,106, in which the web is passed over a guide roll and exerts displacing forces upon that guide roll. The guide roll is mounted for rotation upon a shaft or a pair of stub shafts and the forces exerted by the tensioned web upon the guide roll causes deflection of the supporting shaft or shafts which is sensed by a strain gauge or gauges.

In the device of that patent, a diaphragm is employed to couple the guide roll shaft or shafts through the sensor to fixed frame members which support the entire apparatus. The diaphragm permits minor amounts of shaft misalignment, as well as expansion of components to occur without seriously affecting the accuracy of the measurements. However, the diaphragm is limited in the amount of tolerance which it has for such variables. Moreover, the life of the diaphragm is somewhat limited because flexing leads to fatigue of the material and rupture of the diaphragm is a relatively short period of time. It is therefore the primary object of the present invention to improve the measurement and monitoring of the web tension by incorporating a superior coupling mechanism between the fixed frame members and the guide roll through a strain gauge system.

SUMMARY OF THE INVENTION

In the present invention, the tension exerted by a moving web upon a guide roll is measured by sensing the displacing force applied to a shaft or shafts upon which the guide roll is mounted for rotation. A true cantilever effect is obtained by utilizing a ring-and-ball coupling between a base housing which is bolted or otherwise firmly attached to a fixed frame member and the shaft on which the guide roll is mounted. The coupling includes a pair of concentric rings through one of which two holes are bored at diametrically opposed points. In the other ring, hemispherical indentations are formed at points confronting the holes in the first ring. A bearing ball is disposed in each of the diametrically opposed openings, the rings and balls being thus joined to couple deflection forces between the shaft and the fixed base. A beam carrying a strain gauge or gauges is fixed to the base for deflection from the plane of the bearing balls. Strain coupled to the beam is measured by the gauges mounted on the beam and conventional electrical circuitry such as a Wheatstone bridge is utilized to provide an electrical output that may be displayed upon a meter calibrated in terms of web tension. The electrical output may also serve as a feedback to correct insufficient or excessive web tension. A system such as that described may be incorporated at both ends of the guide roll or, alternatively, a fixed shaft having only one such sensing system may be used.

There follows a description of preferred embodiments of the present invention which should be read with reference to the attached drawing in which.

DESCRIPTION OF THE PREFERRED EMBODIMENT

Figure 1:
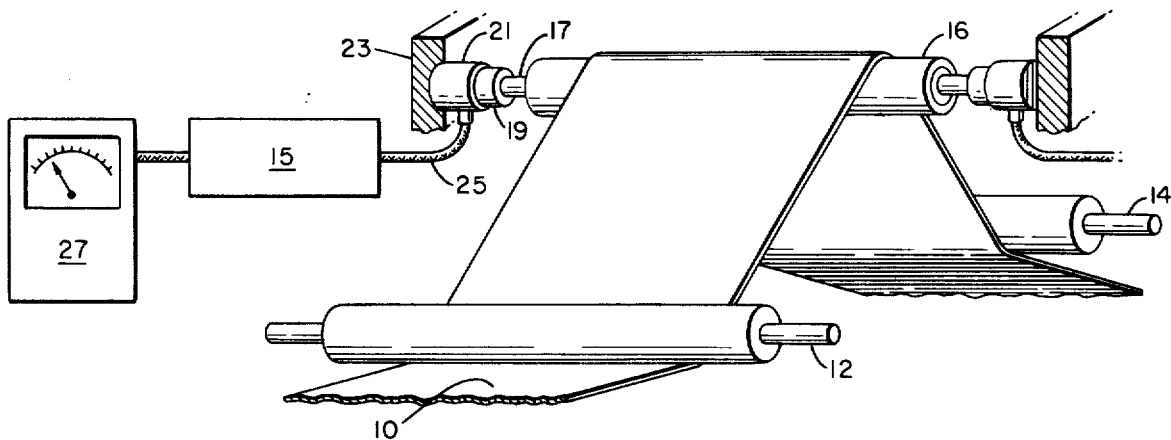
FIG. 1 is an idealized perspective view of the general arrangement of the system by which tension is applied to the web and monitored.

In FIG. 1, there may be seen a web 10 which is continuously moving over guide rolls 12 and 14. Between the guide rolls 12 and 14 a tension monitoring roll 16 is provided. The showing of the tension monitoring roll is somewhat idealized but, obviously, the web 10 is diverted by positioning the roll 16 is such a fashion that the web passing under the guide rolls 12 and 14 exerts a downwardly directed force upon the monitoring roll 16. As is explained and shown in greater detail elsewhere herein, the force exerted on the roll 16 by the web 10 is transmitted from the roll 16 to a shaft 17 which is mounted in a cap 19 fitted into a housing 21, the base of which is firmly bolted to a frame 23. A strain gauge, not visible in this figure, provides a signal varying in accordance with web tension. Connections to the strain gauge are made by the leads 25 which are connected to suitable electrical circuitry 15, the output of which is fed to a meter 26 to display continuously the amount of tension in the web 10. The meter 27 may, of course, be calibrated directly in units of tension. Voltage for the electrical circuitry may be conventionally provided. The output of the circuitry 15 may also be used as a feedback signal to correct or modify web tension as desired through servo motors or other well known equipment not illustrated here.

Figure 2:
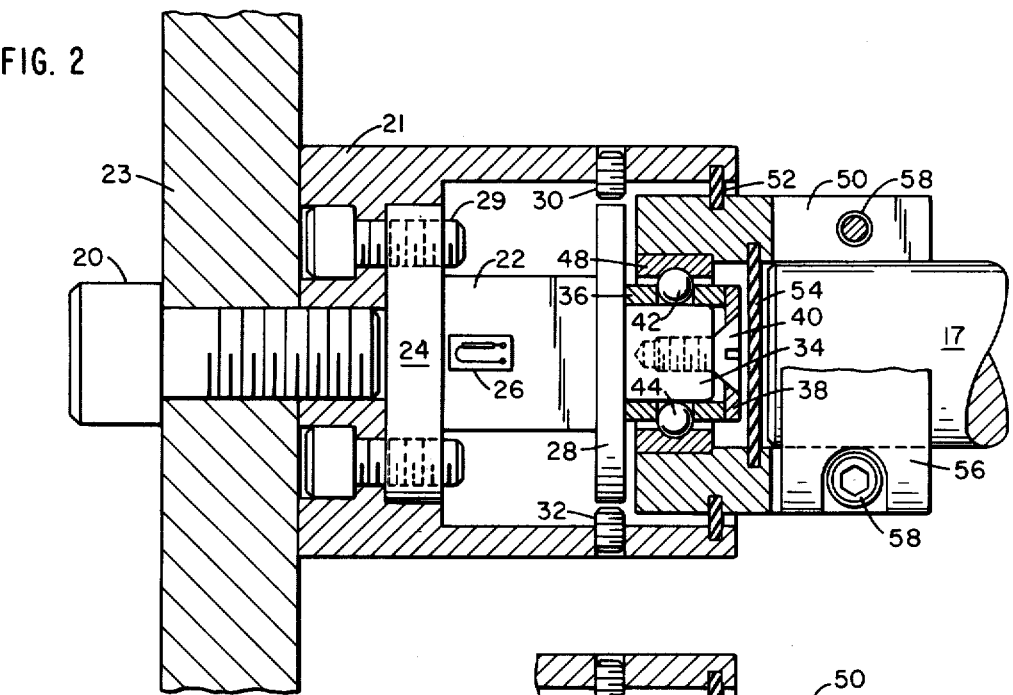
FIG. 2 is a plan view in section of the details of the monitoring and measuring components of the invention.

In some circumstances, it is helpful if both ends of the shaft 17 are similarly mounted and equipped with tension detecting and monitoring components. For purposes of simplicity, only one such unit is schematically shown in FIG. 1 and, in FIG. 2, detail of only one typical arrangement is shown. As may be seen in FIG. 2, the base of the housing 21 is firmly attached to the frame 23 by means of a bolt 20. In turn, a beam 22, which may be integral with its support 24, is firmly attached and fitted in the base by a number of screws of which the screw 29 is typical. The beam or strain member may be rectangular in cross-section and may carry on each of two opposite sides a strain gauge, the strain gauge 26 being visible in FIG. 2.

A stop 28 which may also be integral with the beam 22 has somewhat smaller external dimensions than the internal dimensions of the base 21. Typical adjustable screws 30 and 32 are shown as threaded through the wall of the housing base 21 and can be of any desired number set to limit deflection of the beam 22 by their contact with the periphery of the stop 28.

Extending still further outwardly from the beam 22 is a generally cylindrical mount 34 to which a ring 36 is attached. The ring 36 may be provided with a cap 38 through which a screw 40 passes into a threaded opening to hold the ring firmly in position upon the mount 34.

At two diametrically opposed points along the length of the ring 36, holes are bored through the cylindrical walls. These holes are oriented in a plane parallel to the opposite sides of the beam 22 on which the strain gauges are mounted. In the openings, bearing balls 42 and 44 are disposed against the wall of the mount 34. Concentric with the ring 36 is a second ring 48 having hemispherical indentations formed in its inner surface at the two points which confront the openings in the ring 36. The bearing balls 42 and 44 are restrained by the juxtaposition of the hemispherical indentations and the openings in the inner ring. The outer ring 48, the balls 42 and 44, and the inner ring 36 constitute a load application unit. The load is applied through a head 50 in which the outer ring 48 is firmly fixed. Seals in the form of plastic, rubber or other flexible material are provided between the head 50 and the base 21, as at 52, and also across the interior of the head 50, as at 54.

The shaft 17 is clamped into the head 50 by means of a cap 56 and cap screws 58. Suitable electrical connections to the strain gauges may be made in a conventional manner through the base 21.

Figure 3:
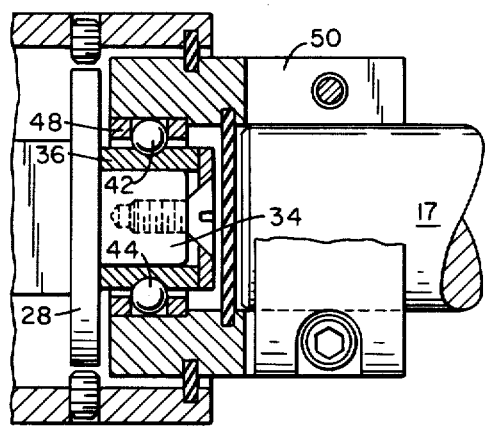
FIG. 3 is a fragmentary cross-sectional view of an alternative coupling system.

In FIG. 3, an alternative embodiment of the load application unit is illustrated. In this instance, the inner ring 36 is provided with two diametrically opposed hemispherical indentations and the outer ring 48 has openings which pass entirely through its wall. As in the case of the previously described embodiment, the holes and indentations confront each other and the bearing balls are restrained by the inner wall of the head 50.

In operation, web tension is exerted upon the guide roll 16 and that tension causes displacement of the shaft 17. The shaft in turn exerts forces upon the beam 22, that force being coupled to the beam 22 through the ring-and-ball load application unit. The beam 22 is cantilever-mounted by reason of its wide end 24 being closely fitted in and bolted to the base 21. Deflection of the beam 22 in response ultimately to web tension is sensed by the strain gauges such as strain gauge 26. Non-linear reactions of the type experienced with diaphragm coupling are avoided and greater efficiency is achieved in the form of greater variation in strain gauge resistance per unit deflection. Accordingly, since smaller variations become measurable, lower maximum stress limits can be tolerated with accompanying decreases of material hysteresis and fatigue.

The design of the coupling is such that misalignment of machine components is tolerable to a large degree and without causing pre-loading of the sensor of the type experienced where diaphragms are used. Moreover, vibration causes fewer problems than arise in diaphragm units and because the coupling is not subject to damage or rupture, the life of the mechanism is extended. The deleterious effects of heat upon the strain gauge are also minimized, because of the low heat transfer from the shaft to the strain gauge through the limited contact area of the coupling.

Lastly, linear expansion of the shaft does not pre-load the strain gauge or cause erroneous output indications.

It has been mentioned that the electrical equipment 27 may include a Wheatstone bridge into which the strain gauges are incorporated in order to provide a sensible output. Obviously, numerous other electrical arrangements are suitable to display properly such outputs or to utilize them as corrective feedback signals to hold web tension within prescribed limits.

What is claimed is:

1. In a web tension monitor which includes at least a tension monitoring guide roll over which said web is movable, a frame, and shaft means for mounting said roll for rotation relative to said frame, a system for continuously monitoring the tension in said web comprising at least one housing having a base attached to said frame and having an open end formed therein, a strain member cantilever-mounted within said housing and extending in a direction away from said frame, at least one strain gauge mounted on said strain member, an electrical circuit connected to said strain gauge to indicate its output, a first ring extending from said strain member, a second ring at the end of said shaft means, said second ring surrounding said first ring, each of said rings having two diametrically opposed confronting openings formed therein, a bearing ball being disposed in each pair of confronting openings, whereby said two rings are coupled together, deflection of said web in response to web tension causing said shaft means to apply cantilever loading force to said strain member, the electrical characteristics and output of said strain gauge thereby being varied.

2. In a web tension monitor as defined in claim 1, the combination wherein said strain member includes a beam having at least two flat parallel sides, a strain gauge being mounted on each of said parallel sides, the openings in said first ring passing entirely through the wall of said first ring at diametrically opposite points, the confronting openings in said second ring comprising hemispherical indentations, each said bearing ball being retained in its associated opening in said first ring in contact with its associated hemispherical indentation in said second ring.

3. In a web tension monitor as defined in claim 1, the combination wherein said strain member includes a beam having two parallel sides, a strain gauge being mounted on each of said parallel sides, the openings in said first and second rings being oriented relative to the planes of said parallel sides such that said bearing balls are located in positions lying within extensions of the planes of said parallel sides.

4. In a web tension monitor as defined in claim 1, the combination wherein said strain member includes a beam having at least two flat parallel sides, a strain gauge being mounted on each of said parallel sides, the openings in said second ring passing entirely through the wall of said second ring at diametrically opposite points, the confronting openings in said first ring comprising hemispherical indentations, each said bearing ball being retained in its associated opening in said second ring in contact with its associated hemispherical indentation in said first ring.

5. In a web tension monitor as defined in claim 1, the combination wherein said strain member includes a support closely fitted and firmly attached by cantilever mounting within said base and a beam integral with said support, deflection of said web in response to web tension being coupled from said shaft through said rings and balls to exert strain upon said beam and detection thereof by said strain gauge.

6. In a web tension monitor as defined in claim 5, the combination wherein said beam includes two parallel sides, a strain gauge being mounted on each of said parallel sides, said two parallel sides lying in planes, said bearing balls disposed in a volume defined by extensions of said planes.

* * * * *